Sept. 24, 1935.   H. C. STOCKDALE   2,015,244
LIME SLAKER
Filed Dec. 9, 1932
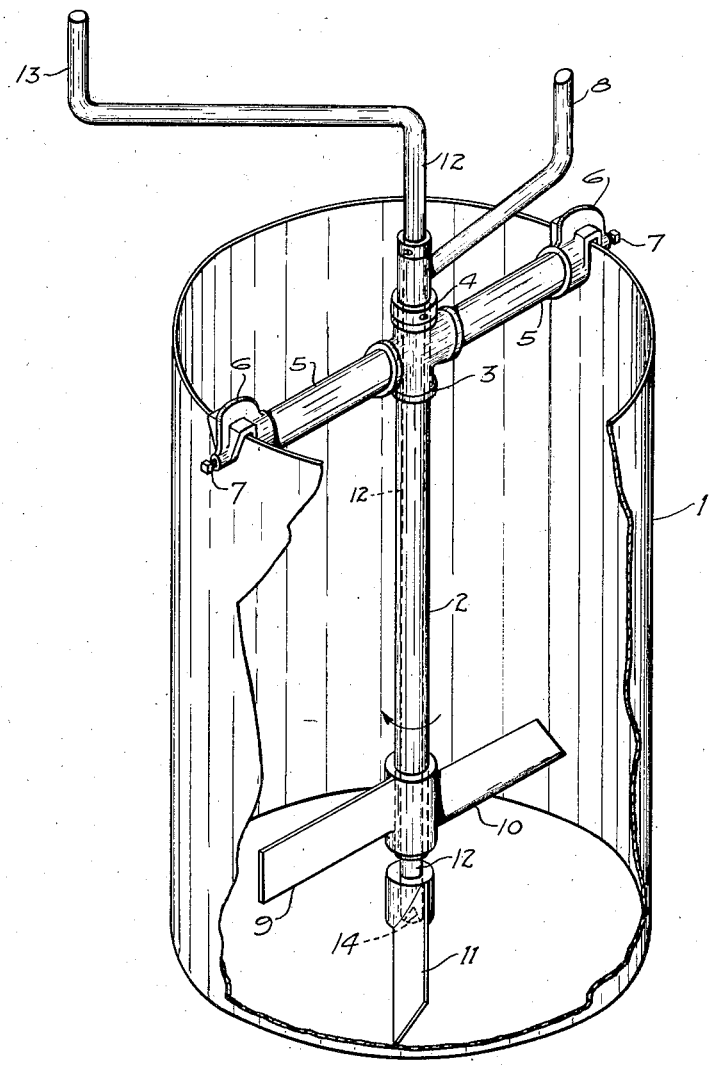
INVENTOR.
HARRY C. STOCKDALE
BY Philip A. Minnis
ATTORNEY.

Patented Sept. 24, 1935

2,015,244

UNITED STATES PATENT OFFICE 2,015,244

LIME SLAKER

Harry C. Stockdale, Ravenna, Ohio, assignor to Food Machinery Corporation, San Jose, Calif., a corporation of Delaware Application December 9, 1932, Serial No. 646,455

2 Claims. (Cl. 23—287)

This invention relates to the art of slaking or hydrating lime, and has to do with a novel form of apparatus adapted for the purpose which is more convenient and efficient than devices heretofore known.

Hydrated or slaked lime is used in considerable quantities by farmers and orchardists in the preparation of fungicides such as Bordeaux mixture which is sprayed upon plants and trees to protect them against damage from insect parasites and fungus growths.

To prepare the spray material, the unslaked lime which is commonly marketed in dry lump form, must be carefully slaked to proper fineness by adding water to it so as to form a smooth paste, it being well known that the addition of water to the unslaked lime causes a chemical reaction during which considerable heat is generated, thereby breaking down the lime into fine particles. In this slaking process the proper control over heat dissipation is essential to the production of a paste of sufficient fineness so that after being diluted and thoroughly mixed with water, it can be introduced into spraying apparatus and discharged therefrom in the form of spray without danger of clogging the equipment and without undue wear on the spray nozzles. It will be appreciated that a coarse product not only has a tendency to clog the spraying nozzles, but also being of an abrasive nature, it results in considerable wear on the nozzles, thus necessitating frequent repairs. The finer or smoother the product is, the less tendency there is toward clogging and excessive wear.

It has been a common practice heretofore to slake lime by placing the dry lumps in a drum or barrel and slowly adding water while stirring the mass until the slaking is completed, by means of a paddle attached to the end of a long handle. The principal difficulty with this method is that considerable caution must be exercised if anything approaching a dependable result is to be obtained, and even under such circumstances, consistently satisfactory results cannot be relied upon. Great care must be exercised to prevent the lime from sticking to the bottom of the container in which event it is likely to burn and from hard lumps of burned lime which cannot be reduced to the proper fineness required for the preparation of satisfactory spray material. On the other hand, over-vigorous agitation of the mixing paddle in attempting to prevent burning frequently results in accelerating the dissipation of the heat of reaction, thus chilling the mixture and preventing the successful completion of the slaking process.

It is an object of this invention to provide a lime mixing and slaking apparatus which requires little or no skill to operate and which can be relied upon to produce a consistently satisfactory product.

Another object is to construct a lime mixing and slaking device in which is incorporated scraping and agitating means for preventing burning of the lime without danger of cooling it by intermixing air therewith, and separate mixing means of novel and effective character.

It is also an object to provide a lime mixing and slaking device which is readily attachable to and detachable from the container with which it is used whereby it can be transferred from one container to another thus avoiding the necessity of emptying the container when several successive batches of spray mixture are to be made.

With these objects in view, as well as others not enumerated, the invention will be more readily understood by reference to the accompanying drawing which illustrates an apparatus embodying the principles of the invention.

As shown, the apparatus comprises a drum 1 for containing the lime mixture, in which is disposed the mixing and scraping apparatus including a hollow, vertical shaft 2 slidably and rotatably mounted in a bearing 3 and supported by means of a collar 4 fixed to the shaft and resting upon the top of the bearing. Arms 5 extend outwardly from the bearing 3 and are provided at their outer ends with U-shaped brackets 6 designed to fit down over the top edge of the drum whereby to support the entire assembly. Set screws 7 engaging with the drum wall serve to secure the assembly in place.

The shaft 2 is provided at its upper end with a handle 8 by which it may be rotated, and at its lower end with a pair of mixing paddles 9 and 10. The faces of the paddle 10 are disposed at an angle to the horizontal so that upon rotation of the shaft 2 in the direction indicated by the arrow the lime paste is agitated and lifted upwardly. The paddle 9 is secured to the shaft 2 diametrically opposite to the paddle 10 and its faces lie in a vertical plane. This vertical paddle following the inclined paddle tends to mash the lime paste and tear it apart more effectively than the inclined paddle, while the latter causes a circulation of the paste so that all portions of it may be acted upon by the vertical paddle. Preferably also the paddles 9 and 10 are secured to the shaft 2 in staggered relation as illustrated in the drawing wherein it may be seen that the upper and lower edges of the paddle 10 are at a lower elevation than the edges of the paddle 9. This arrangement of the paddles greatly increases their effectiveness in mixing the lime and reducing it to the proper fineness with a minimum expenditure of time and effort.

In order to prevent the paste from sticking to the bottom of the drum and thereby burning, an inclined scraper blade 11 is secured to the lower end of a shaft 12 which extends upwardly through the hollow shaft 2 and is provided with a handle 13. A conical pivot 14 projecting from the bottom of the drum is seated in a suitable recess in the end of the shaft 12 and serves to center and stabilize the entire mixing assembly.

In the operation of the apparatus, the dry lime is placed in the bottom of the drum 1 to a level above the scraper blade 11, the usual amount being about 50 pounds. Water is then slowly added while the crank 13 is turned to rotate the shaft 12 and scraper 11 which agitates the lime and keeps it from burning to the bottom of the drum. Since the scraper paddle rotates in a horizontal plane below the level of the liquid it has no tendency to mix air into the mixture and thus prematurely chill it, as frequently occurs in the use of the upright paddles now in use.

By reason of the slidable mounting of the mixing shaft 2, large lumps of lime carried around by the scraper blade cannot become wedged between it and the mixer blades so as to cause them to rotate with the scraper, as the mixer blades are free to rise and permit passage therebeneath of any large lumps of lime. Actuation of the mixer blades by movement of large lumps of lime is thus avoided, thereby precluding premature chilling of the mixture by rotation of the mixer blades during the initial stages of the mixing process before these blades are completely submerged.

When sufficient water has been mixed with the lime to make a thick paste, the scraper blade is operated without further addition of water until the paste has been sufficiently cooked and stirred to reduce it to a desired fineness of grain. The paste thus produced is too thick to be used in spraying equipment and must be diluted by the addition of a further quantity of water which is slowly added until the level of the liquid is brought above the tops of the upper paddles 9 and 10 meanwhile continuing the operation of the scraper blades.

While the paste is thus being diluted its temperature is gradually reduced until continuous operation of the scraper blade may be dispensed with, only an occasional turn being necessary thereafter to prevent sticking to the bottom of the drum. The mixture is then stirred up into a homogeneous liquid by turning the crank 8 to rotate the mixing paddles 9 and 10 which thoroughly agitate the liquid and further increase the fineness of the particles of lime to the final degree required for use in spraying equipment. As heretofore pointed out, the disposition of the mixing paddles is such that the inclined blade operates to lift the mixture upwardly and so cause it to circulate, while the vertical blade thoroughly agitates and mixes it. These blades also operate entirely below the liquid level and consequently have no tendency to mix air into the mixture and thereby prematurely chill it.

When the preparation of the spray mixture has been completed, the entire mixing assembly may be removed from the drum and introduced into another drum for the preparation of a second batch if desired, thus avoiding the necessity of emptying the first drum.

Having now described my invention, and in what manner the same may be used, what I claim as new and desire to secure by Letters Patent is:—

1. An apparatus for slaking lime comprising a mixing drum, a vertically disposed hollow mixing shaft extending centrally therewithin and terminating short of the drum bottom, means for rotatably supporting said mixing shaft, mixing blades extending horizontally from said shaft within the drum and in vertically spaced relation to the drum bottom, a second shaft journalled within said mixing shaft and rotatable independently thereof, said inner shaft projecting beyond the lower end of the mixing shaft, a scraper blade extending horizontally from the lower end of said inner shaft and in scraping engagement with the drum bottom, said mixing shaft being freely slidable over said inner shaft to permit said mixing blades to be lifted away from the scraper blade for releasing lumpy material wedged therebetween, and independently operable means associated with said shafts for operating either of them independently of the other.

2. An apparatus for slaking lime comprising a mixing drum, a vertically disposed hollow mixing shaft extending centrally therewithin and terminating short of the drum bottom, means for rotatably supporting said mixing shaft, a pair of mixing blades extending horizontally from said shaft within the drum in vertically spaced relation to the drum bottom and having their upper and lower edges arranged in staggered relation, the faces of one of said blades being vertical and the faces of the other blade being inclined to the vertical, a second shaft journalled within said mixing shaft and rotatable independently thereof, said inner shaft projecting beyond the lower end of the mixing shaft, a scraper blade extending horizontally from the lower end of said inner shaft and in scraping engagement with the drum bottom, and independently operable means associated with said shafts for operating either of them independently of the other.

HARRY C. STOCKDALE.